Feb. 23, 1971 M. A. SHRIRO ET AL 3,566,329
GANGED POTENTIOMETER STRUCTURE
Filed June 26, 1968
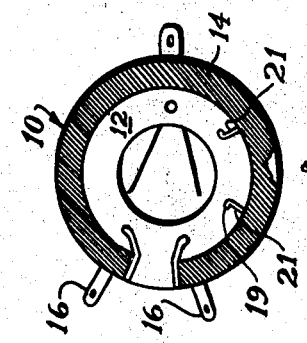
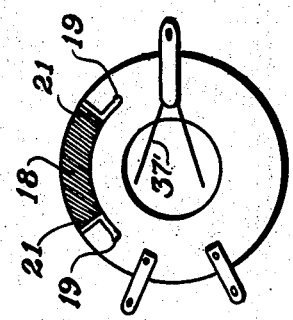
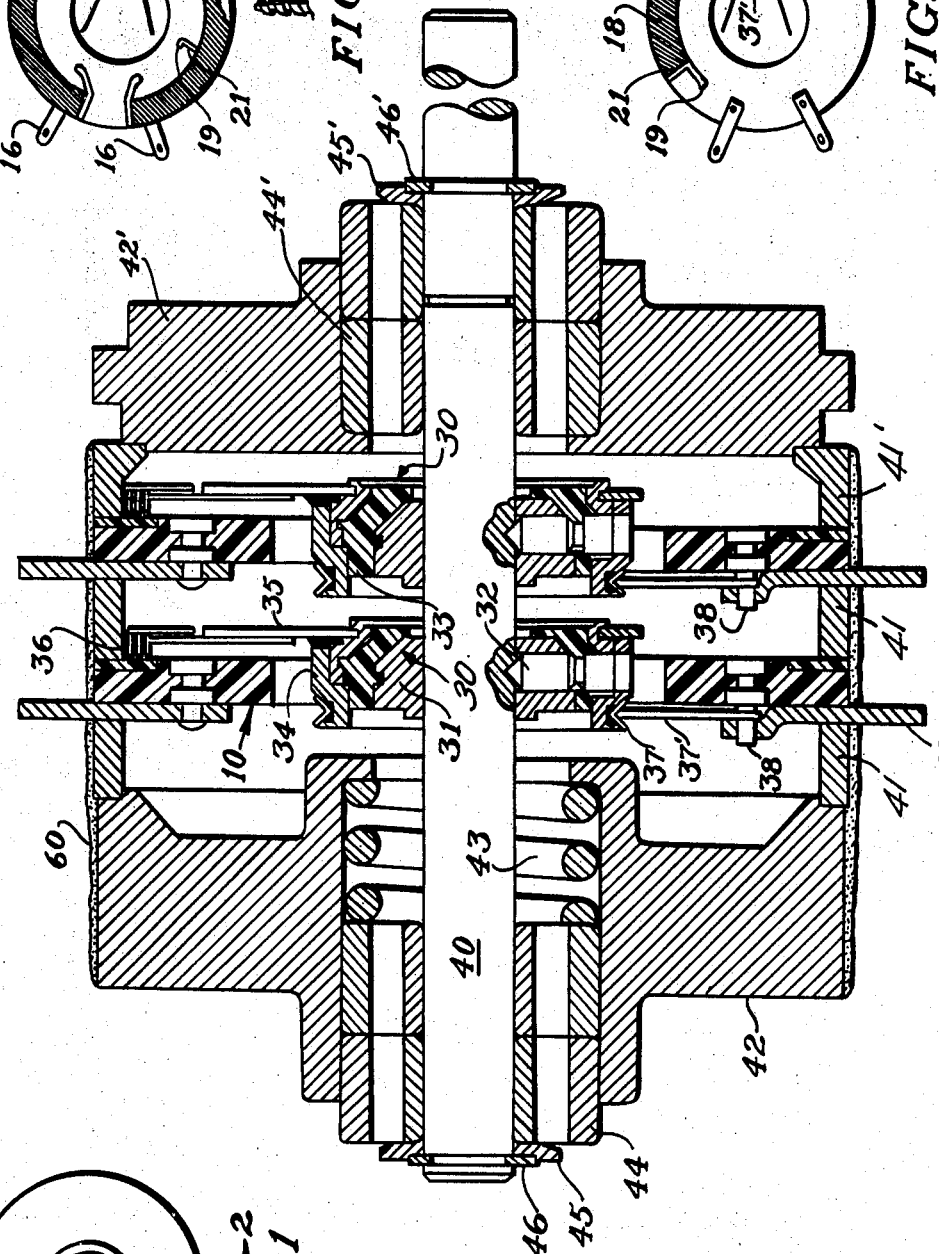
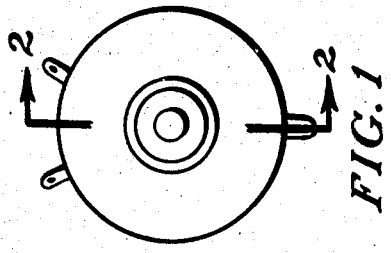
INVENTORS,
MORRIS A. SHRIRO
MYRON A. COLER
BY Leonard H. King
ATTORNEY

United States Patent Office 3,566,329
Patented Feb. 23, 1971

3,566,329
GANGED POTENTIOMETER STRUCTURE
Morris A. Shriro, Mount Vernon, and Myron A. Coler, Scarsdale, N.Y., assignors to Markite Corporation, New York, N.Y.
Filed June 26, 1968, Ser. No. 740,259
Int. Cl. H01c 5/02
U.S. Cl. 338—132                    1 Claim

ABSTRACT OF THE DISCLOSURE

A ganged potentiometer structure having spring means for maintaining the elements under compression during assembly. The individual elements may be individually phased and after final assembly trimmed to obtain a desired output resistance characteristic relative to shaft position. After final adjustment an adhesive sealant agent is applied to the elements. A monolithic structure is obtained.

---

This invention relates to multielement precision potentiometers employing a common, rotatable, actuating shaft and, in particular, to means for trimming and for phasing individual units to provide a desired function conformity and electrical relationship for each element relative to the corresponding angular position of the common actuating shaft.

BACKGROUND OF THE INVENTION

Many electromechanical devices such as computers, navigational aids, radar sets, and other like devices, require the translation of the angular position of a rotating shaft into a plurality of electrical signals. Conventionally, this is accomplished through the use of a multiplicity of individual potentiometer cups coupled together and varied simultaneously by a common control shaft. The term "cup" is employed with reference to a modular potentiometer section which includes a resistance element, takeoff means, wipers, and a set of terminals.

Multitap potentiometers have many uses in a variety of electronic systems. Among their important applications is that of generating functions by means of voltage and/or resistance padding. In certain computers it is desirable to convert a single shaft input motion to a number of different functional output signals. This can be accomplished by ganging a large number of linear multitap potentiometers into a single construction wherein each potentiometer cup resistance element is contacted by one or more wipers actuated by the common shaft.

In ganging a large number of potentiometer cups, maintaining the concentricity of the resistive elements relative to the shaft becomes a problem as the element distance from the shaft bearings increases. In turn, any lack of concentricity contributes to function conformity output errors. One solution to the concentricity problems, disclosed hereinafter, is to house the several potentiometer elements in a monolithic case in which the concentricity of the case I.D. to the shaft bearing is closely held. In such a design, the concentricity of the resistive track to the input shaft is dependent on the fit between the element O.D. and the case I.D., the concentricity of the case I.D. to the shaft bearing. The use of the present design avoids the successive buildup of eccentricities which may be encountered when a large number of modular potentiometer cups are located, with respect to one another, by means of pilot diameters and held together by means of clamp rings or screws. In the present design the resistance elements may be radially shifted to obtain optimum concentricity prior to bonding into a monolithic structure.

A preferred type of potentiometer element employs a conductive plastic resistance element and may employ a conductive plastic pad or trimming resistor. The conductive plastic members are supported on an insulator substrate. It is highly desirable to be able to trim or adjust the resistance of the element on a point-to-point basis after assembly has been completed, so that any deviation introduced by a deviation or eccentricity of the shaft can be eliminated. In the construction disclosed hereinafter, the potentiometer may be completely assembled with the elements in their proper orientation and, after phasing, the entire assembly is coated with a synthetic resin to weld the elements into a monolithic structure; thereafter the conductive plastic elements may be trimmed.

Accordingly, it is an object of this invention to provide an improved multielement, precision potentiometer.

It is a different object to provide a multielement precision potentiometer having means for trimming the element after assembly of the potentiometer.

Still a further object of this invention is to provide improved means for phasing the cups of a multielement potentiometer.

A different object of this invention is to provide an improved clamping means for a multielement potentiometer.

Still a further object of this invention is to provide an improved multielement potentiometer employing conductive plastic elements.

Another object of the invention is to provide a method of making multielement precision potentiometers.

These and other objects, features and advantages of the invention will, in part, be pointed out with particularity and will, in part, become obvious from the following more detailed description of the invention taken in conjunction with the accompanying drawing which forms an integral part thereof.

BRIEF DESCRIPTION OF THE DRAWING

FIG. 1 is an end view of the potentiometer of this invention;
FIG. 2 is a section taken along line 2—2 of FIG. 1;
FIG. 3 is a plan view of a typical element; and
FIG. 4 is a plan view of the reverse side of the element of FIG. 4.

Referring to FIG. 3 there is shown the element 10 comprising an insulator substrate 12 having a conductive plastic resistance track 14 and a pair of terminals 16. It will be noted that the resistance track 14 is on the periphery of the element. This is contrary to normal practice. The other side of the element may have padding resistors 18 again located along the periphery. Interconnection between track and pad is made by means of a feedthrough terminal 19 to which conductive strips 21 join the resistance element and padding members.

A plurality of such elements are then assembled in stacked relationship, as shown in FIG. 2, with insulator rings 41 arranged between successive elements.

A brush block assembly 30 includes a hub member 31, a locking setscrew 32, an insulator sleeve 33 and a metal color 34. A brush arm 35 carries a brush 36. The brush arm is connected to collar 34 as is slip ring 37. A hairpin wiper 37' contacts slip ring 37. Thus electrical connection is made from the resistance track to the hairpin wiper, metal post 38 and to terminal 39.

The potentiometer is assembled by mounting a brush block assembly on shaft 40, positioning an element 10 coaxially about the shaft, adding a spacer 41 and then repeating the operation until the desired number of elements are assembled.

Thereafter an end member 42, spring 43, thrust bearing 44, washer 45 and snap ring 46 are positioned on the shaft. At the other end a spacer 41', an end bell 42' and thrust bearings 44' are added and clamped in place by means of washer 45' and snap ring 46'. End bell 42 may be a servo mount type as shown.

It will be appreciated that at this point there is no housing structure as found in a conventional potentiometer and that the entire assembly is held in compression through the action of spring 43 acting against thrust bearing 44, which, in turn, transfers the load to the shaft through washer 45 and snap ring 46. Upon completion of the assembly, the operator rotates each element back and forth, until it is determined that the element has the proper phase relationship to the brush. After phasing operations are completed, the entire assembly is coated with an epoxy cement 60. A small brush is suitable as an applicator for this purpose. Thereafter the shaft is rotated and the output voltage reading across the fixed terminals of the resistance element is compared for various angular positions of the shaft with that of a standard potentiometer. If the potentiometer element is outside the predetermined tolerance, then a drill or cutter D (FIG. 3) is used to abrade away a portion of the respective padding resistor or portions of the conductive plastic track until the desired performance curve is obtained. It is also possible to effect a degree of calibration by adding a highly conductive material along the exposed edge of the track in a selective manner. It should be noted that the presence of the codnuctive plastic track on the outer periphery renders this approach practical.

After trimming, the holes made by drill D may be sealed with a sealant such as epoxy resin, silicone rubber or other equivalent products.

For particularly low torque applications spring 43 may be removed after assembly and adjustment has been completed.

This may be done by removing bearings 44 and the spring 43 and replacing the spring with a suitably sized bushing.

If it is intended that the spring be replaced the respective positions of the bearings and bushings may be interchanged from that shown in FIG. 2. It will also be appreciated that the spring can be temporarily mounted externally for assembly purposes permitting the end bell 42 to be similar to end bell 42''. This could be done by clamping the spring between the end face of the bell and an enlarged washer which would ultimately be replaced by washer 45.

In applications where final trimming of the element is not required the resistance track need not extend to the outer edge.

Having thus disclosed the best embodiment of the invention presently contemplated, it is to be understood that various changes and modifications may be made by those skilled in the art without departing from the spirit of the invention.

What we claim as new and desire to secure by Letters Patent is:

1. A potentiometer comprising at least one annular insulated substrate bearing a resistance track; a pair of end bell means each having a central bore, said end bell means being positioned on opposite sides of said substrate; a central shaft extending through said substrate; bearing means supporting said shaft in said end bell bores; means carried by said shaft for preventing axial movement thereof inwardly of said substrate; compression means arranged to act between at least one said end bell and said shaft so as to compress said substrate between said end bells; wiper means carried by said shaft; brush means carried by said wiper means in contact with said resistance track; a padding resistor on a radial face of said substrate, said padding resistor extending to the outer periphery thereof; and electrical connection means extending through said substrate and connecting said padding resistor and said resistance track.

References Cited
UNITED STATES PATENTS

| | | | |
|---|---|---|---|
| 1,962,438 | 6/1934 | Flanzer et al. | 338—195X |
| 2,134,870 | 11/1938 | Fruth | 338—162X |
| 2,657,295 | 10/1953 | Barclay | 338—132 |
| 2,859,319 | 11/1958 | Karg | 338—132 |
| 2,958,837 | 11/1960 | Barden | 338—134 |

FOREIGN PATENTS

| | | | |
|---|---|---|---|
| 1,522,535 | 3/1968 | France | 338—162 |
| 479,045 | 1/1938 | Great Britain | 338—135 |
| 842,607 | 7/1960 | Great Britain | 338—130 |
| 1,017,345 | 1/1966 | Great Britain | 338—162 |

LEWIS H. MYERS, Primary Examiner

A. T. GRIMLEY, Assistant Examiner

U.S. Cl. X.R.

38—162, 184